Patented Apr. 14, 1953

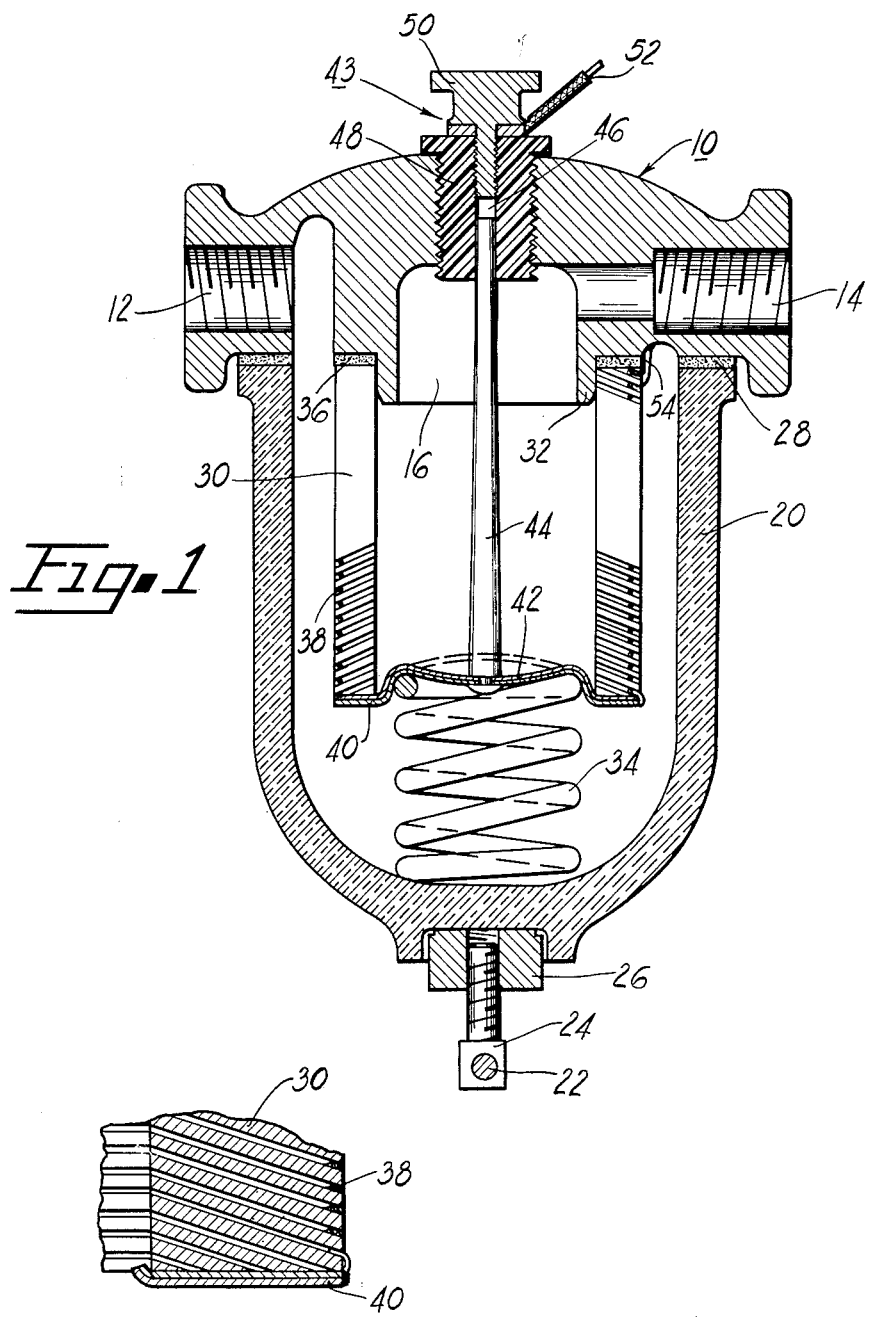

2,635,174

UNITED STATES PATENT OFFICE 2,635,174

FILTER

Walter Kasten, Detroit, Mich., assignor to Bendix Aviation Corporation, South Bend, Ind., a corporation of Delaware Application June 17, 1950, Serial No. 168,783

11 Claims. (Cl. 219—39)

The present invention relates to a fluid filtering device, and more particularly to a filtering device in which the filter element is heated to prevent the formation of ice on the surface thereof.

In filtering fuel for an internal combustion engine at low temperatures, small amounts of water entrained in the fuel tend to accumulate in the form of ice on the surface of the filter element, occasionally forming a continuous impervious coating over the entire surface of the element, and completely cutting off the flow of fuel to the engine. Filtering devices and/or elements adapted to prevent the formation of ice on the surface of the element and to raise the temperature of the fuel to a point where vaporization will readily occur have been disclosed and claimed in my copending applications, Serial No. 33,628, filed June 17, 1948, and No. 83,442, filed March 25, 1949. The present development is an improvement on the inventions disclosed in the earlier cases and utilizes certain features of the inventions of both cases. One of the principal objects of the present invention is to provide a filtering device having a relatively simple fully automatically controlled heating means for maintaining the surface of the filter element above a predetermined minimum temperature.

Another object of the invention is to provide a filtering device having an easily assembled electrically heated filter element with a temperature responsive means associated therewith for controlling said heating means.

Another object is to provide a filter element, an electrical heating means therefor, and a thermostatic control for said means assembled as an integral unit for installation in a filtering device.

A further object of the invention is to provide a combination of a relatively simple heating means for a fuel filtering device and a control therefor, which is adapted to prevent the formation of ice on the surface of the filter element and to raise the temperature of the fuel to a point at which vaporization will readily occur.

Further objects and advantages of the invention will become apparent from the following description and accompanying drawing wherein, Figure 1 is a vertical cross section of a filtering device embodying the present invention; and Figure 2 is an enlarged cross-sectional view of a portion of the filtering element shown in Figure 1.

Referring more specifically to the drawing, wherein one embodiment of the invention is shown, numeral 10 designates a filter head in which are provided a fluid inlet 12 and a fluid outlet 14, said fluid inlet and outlet being separated from one another in the filter head by an annular-shaped partition 16 formed integrally with the internal portion of the head. The inlet and outlet are threaded internally to receive suitable fittings for installation of the filter in a fuel line or the like. A fuel bowl 20 of glass or other electrical nonconducting material depends from the lower side of the head and is secured in place by a bale-like member 22 extending from one side of the head under the bottom of the bowl through fitting 24 and to the other side of the head. Fitting 24 is threadedly received in a nut 26 disposed in a recessed portion in the bottom of bowl 20. Rotation of nut 26 firmly seats bowl 20 in a fluid-tight relationship on a gasket 28 on the lower side of head 10. A filter element generally designated by numeral 30 is mounted about an annular extension 32 of partition 16 and is held in place by a coil spring 34 reacting between the bottom of bowl 20 and the lower end of said element. A gasket 36 may be provided between the filter element and the seat for said element on the lower side of head 10.

The element 30 preferably consists of layers or convolutions helically wound to form the side walls of the element and having radial pores between each layer to provide passages for the fluid being filtered. The layers of the filtering element may be of a fibrous material held together by a discontinuous bond so distributed that radial pores are formed between the layers at frequent intervals. The discontinuity of the bond may be controlled by using paper or fibrous material having a predetermined rugosity on both surfaces thereof so that the valleys of the rugosities form the passages and the peaks thereof form the points of contact between the adjacent layers. The paper or fibrous material is preferably treated before the element is formed with a thermosetting resinous material such as phenolic formaldehyde condensation product. After the element has been formed, it is heated to a temperature and for a time sufficient to cause the resinous material to set, making the material forming the layers of the element, but not the element itself, impervious to fluid, the pores between the layers remaining open after the treatment.

In the fabrication of the element, ribbon or ribbon-like material of a width substantially equal to the thickness of the final filter element wall is wound edge-wise to form a cylindrical member which is thereafter cut to the desired length of the filter element. The method for making the filter element is disclosed and claimed in my Patent No. 2,421,704, issued June 3, 1947.

The element is heated during operation by an electrical resistance wire 38, preferably embedded in the element wall adjacent the outside surface thereof. This wire is wound simultaneously with the ribbon between the convolutions of the element so that the final article consists of alternate layers of paper or the like and the resistance wire, such as that shown in Figure 2. The rugosities of the material are compressed slightly by the wire as shown in Figure 2 to permit adjacent convolutions to be bonded together to form a rigid compact unit. The wire between the layers does not materially restrict the flow of fluid through the radial pores between said layers. The method of making this element containing the wire is disclosed and claimed in my copending application Serial No. 83,442, filed March 25, 1949.

After the side walls of the element have been formed by the foregoing procedure, one end of the element is closed by a plate-like member 40 of bimetal construction having a flexible diaphragm center 42 which is adapted to snap between the position shown in full lines and the position shown in broken lines as the fluid being filtered rises above or falls below a predetermined temperature. When the element is assembled in the filtering device, spring 34 seats in a recessed portion of the plate surrounding the diaphragm portion. The electrical heating means of the element is controlled by the operation of the diaphragm portion 42 which is adapted to assume the position shown in full lines when the fluid being filtered is above a predetermined temperature, for example 0° F., and to assume the position shown in broken lines when the fluid is below said predetermined temperature. The temperature at which the water entrained in the fluid tends to form ice on the surface of the element is usually substantially below freezing. Different plates are used for selecting various temperatures at which the diaphragm portion operates to close the heating circuit. In an electrical switch 43, a stem 44 secured to the center of diaphragm portion 42 and actuated thereby extends into a vertical hole 46 of a sleeve 48 of nonconducting material, such as plastic, threadedly received in a bore in the upper end of head 10. An electrical contact member 50 extends downwardly into hole 46 and is adapted to be contacted by stem 44 when diaphragm portion 42 has snapped into the position shown in dotted lines, i. e. when the temperature is below, for example, 0° F. Contact 50 is connected to a suitable source of current through lead 52. One end of the electrical heating wire is connected to plate 40, which is connected with lead 52 through stem 44 and contact 50, and the other end of the wire is grounded to filter head 10 through a contact member 54 secured to said element.

In the operation of the filtering device at a temperature above a predetermined degree, such as 0° F., diaphragm portion 42 occupies the position shown in full lines in Figure 1. If during the filtering operation the temperature of the fuel should drop below the predetermined degree, the diaphragm portion snaps into the position shown by broken lines, thus forcing stem 44 upwardly until the upper end thereof contacts the lower end of contact 50, closing the electrical circuit including the wire 38 embedded near the surface of the element. Since the wire is adjacent the outside surface of the element, only a short time is required to raise the temperature of the element surface sufficiently high to melt the ice thereon and to prevent further formation of ice on the surface. If the temperature of the fluid increases above the predetermined degree, the diaphragm portion 42 snaps downwardly to the position shown in full lines, thus breaking the contact between the upper end of stem 44 and contact 50 and thereby opening the circuit of the element heating means. It is thus seen that the heating of the element is controlled automatically as the temperature conditions require.

The element 30, plate 40 and stem 44 are preferably formed as an integral unit which can be easily assembled in the element and readily removed for cleaning or replacement. Modifications may be made in the present structure without departing from the scope of the present invention. While it is preferable to use a nonconducting material for the side walls of the filter element and electrical conducting material for plate 40, stem 44 and filter head 10, electrical conducting material may be used for the side walls if insulated wire is used and nonconducting material may be used for plate 40, stem 44 and head 10 if suitable conductors are included therein for completing the circuit when stem 44 is raised by diaphragm portion 42. Further modifications may be made to suit requirements.

I claim:

1. A fluid filtering device comprising a head having a fluid inlet passage and a fluid outlet passage, a bowl connecting said inlet and outlet passages, a filter element in said bowl interposed between said passages and having an electrical heating means, a plate-like member on one end of said element having a temperature responsive portion, and a switch adapted to be actuated by said temperature responsive portion for controlling said heating means.

2. A fluid filter device comprising a head having a fluid inlet passage and a fluid outlet passage, a bowl connecting said inlet and outlet passages, a cylindrical filter element in said bowl interposed between said passages and having an electrical heating means, a plate-like member on one end of said element having a temperature responsive portion, a switch for controlling said heating means, and a stem for operatively connecting said switch with the temperature responsive portion of said plate-like member.

3. A fluid filtering device comprising a head having a fluid inlet passage and a fluid outlet passage, a bowl connecting said inlet and outlet passages, a hollow cylindrical filter element in said bowl interposed between said passages and having an electrical heating means adjacent the surface thereof, a plate-like member closing one end of said element and having a temperature responsive portion, a switch adapted to be actuated by said temperature responsive portion for controlling said heating means, and a stem for operatively connecting said switch with the temperature responsive portion of said plate-like member.

4. A fluid filtering device comprising a head having a fluid inlet passage and a fluid outlet passage, a bowl connecting said inlet and outlet passages, a cylindrical filter element in said bowl functionally interposed between said passages and having side walls of helically-wound strip material, a plate-like member on one end of said element having a temperature responsive central portion of bimetal construction, a switch adapted to be actuated by said temperature responsive portion, and an electrical heating wire between the convolutions forming the side walls of the filter element, one end of said wire being grounded to said head and the other end thereof being connected to said switch.

5. A fluid filtering device comprising a head having a fluid inlet passage and a fluid outlet passage, a bowl connecting said inlet and outlet passages, a hollow cylindrical filter element in said bowl functionally interposed between said passages and having side walls of helically wound strip material, a plate-like member closing one end of said element and having a flexible temperature responsive central portion, an electrical switch mounted in said head, a stem operatively connecting said switch with the temperature responsive portion of said plate-like member, and an electrical heating wire wound with the convolutions forming the side walls of the filter element, one end of said wire being grounded to said head and the other end thereof being connected to said switch.

6. A fluid filtering device comprising a metallic head having a fluid inlet passage and a fluid outlet passage, a bowl connecting said inlet and outlet passages, a hollow cylindrical filter element in said bowl functionally interposed between said passages and having side walls of helically wound strip material, a metallic plate-like member closing one end of said element and having a flexible temperature responsive central portion, an electrical switch mounted in said head, a metallic stem operatively connecting said switch with the temperature responsive portion of said plate-like member, and an electrical heating wire wound with the convolutions forming the side walls of the filter element, one end of said wire being connected with said head and the other end thereof being connected with said plate-like member.

7. An element for a filtering device comprising cylindrical side walls of helically wound strip material, a wire embedded in said walls between the convolutions of said strip material for heating said element, a plate-like member on one end of said element having a portion adapted to move in response to changes in temperature and a movable stem connected to said portion and adapted to actuate a means for controlling the electrical current through said wire.

8. An element for a filtering device comprising side walls of helically wound strip material, a wire embedded in said walls between the convolutions of said strip material for heating said element, and a plate-like member closing one end of said element and having a portion adapted to move in response to changes in temperature for controlling the electrical current through said wire.

9. An element for a filtering device comprising cylindrical side walls of helically wound strip material, a wire embedded in said walls between the convolutions of said strip material for heating said element, a plate-like member closing one end of said element and having a central portion adapted to move in response to changes in temperature, a means for controlling the electrical current through said wire, and a movable stem connected to said central portion and adapted to actuate said means for controlling the electrical current through said wire.

10. An element for a filtering device comprising a filter medium, an electrical heating wire adjacent the surface of said medium, and a plate-like member having a portion adapted to move in response to changes in temperature for controlling the electrical current through said wire.

11. In a filtering device, a filter medium, an electrical heating wire adjacent the surface of said medium, and a thermostatic element operatively connected with said wire and mounted in close proximity to said filter medium for controlling the electrical current through said wire.

WALTER KASTEN.

References Cited in the file of this patent

UNITED STATES PATENTS

| Number | Name | Date |
| --- | --- | --- |
| 1,040,124 | Benham | Oct. 1, 1912 |
| 1,075,978 | Joerin et al | Oct. 14, 1913 |
| 1,093,406 | Hamerschlag | Apr. 14, 1914 |
| 1,173,469 | White | Feb. 29, 1916 |
| 1,318,546 | Dodge | Oct. 14, 1919 |
| 2,044,611 | Hodges | June 16, 1936 |